United States Patent
Bucknell

(10) Patent No.: US 9,025,573 B2
(45) Date of Patent: May 5, 2015

(54) INTRODUCING A DELAY IN THE TRANSMISSION OF A NACK FOR A PACKET RECEIVED EMPLOYING COORDINATED MULTI-POINT TRANSMISSION

(75) Inventor: Paul Bucknell, Brighton (GB)

(73) Assignee: Fujitsu Limited, Kawasaki (JP)

( * ) Notice: Subject to any disclaimer, the term of this patent is extended or adjusted under 35 U.S.C. 154(b) by 595 days.

(21) Appl. No.: 13/356,164

(22) Filed: Jan. 23, 2012

(65) Prior Publication Data

US 2012/0120927 A1 May 17, 2012

Related U.S. Application Data

(63) Continuation of application No. PCT/GB2009/002030, filed on Aug. 20, 2009.

(51) Int. Cl.
*H04L 1/18* (2006.01)
*H04B 7/02* (2006.01)
*H04B 7/155* (2006.01)

(52) U.S. Cl.
CPC .......... *H04L 1/1829* (2013.01); *H04B 7/15592* (2013.01); *H04L 1/1812* (2013.01); *H04B 7/022* (2013.01); *H04B 7/026* (2013.01)

(58) Field of Classification Search
USPC ................................. 370/328–336; 455/67.11
See application file for complete search history.

(56) References Cited

U.S. PATENT DOCUMENTS

| 8,670,377 B2 * | 3/2014 | Yi et al. ........................ 370/328 |
| 2006/0291410 A1 * | 12/2006 | Herrmann ..................... 370/328 |
| 2007/0109991 A1 * | 5/2007 | Bennett ......................... 370/328 |
| 2010/0112957 A1 * | 5/2010 | Kong et al. ................ 455/67.11 |

FOREIGN PATENT DOCUMENTS

| WO | 2007/129872 | 11/2007 |
| WO | 2009/064059 | 5/2009 |

OTHER PUBLICATIONS

International Search Report issued for corresponding International Patent Application PCT/GB2009/002030, mailed Jun. 4, 2010.
I2R; "Opportunistic uplink coordinated multi-point reception for LTE-A"; 3GPP TSG RAN WG1 Meeting #57b; R1-092297; Los Angeles, California, Jun. 29-Jul. 3, 2009.
Huawei; "RAN2 considerations for coordinated multipoint transmission and reception"; 3GPP TSG-RAN WG2 Meeting #66; R2-093107; San Francisco, USA May 4-8, 2009.
Fujitsu: "UL CoMP HARQ Processing"; 3GPP TSG-RAN WG2 Meeting #66; R2-093078; San Francisco, USA, May 4-8, 2009; Sections 2 and 3, Figures 3,4.
Alcatel-Lucent Shanghai Bell, Alcatel-Lucent; "Impact of UL CoMP to HARQ operations"; R2-093092; 3GPP TSG RAN WG2 Meeting #66; San Francisco, US, May 4-8, 2009.

(Continued)

*Primary Examiner* — Vincelas Louis
(74) *Attorney, Agent, or Firm* — Myers Wolin, LLC

(57) ABSTRACT

A communication method in a first apparatus, in which the first apparatus receives data via a direct route from a second apparatus and transmits in response an acknowledgement signal, wherein if the same data has also been transmitted via an indirect route and the data is not properly received via the direct route, the first apparatus introduces an indirect-route delay in transmitting the acknowledgement signal to allow receipt of the data via the indirect route, and otherwise no indirect-route delay is introduced.

20 Claims, 7 Drawing Sheets

(56) References Cited

OTHER PUBLICATIONS

Alcatel-Lucent Shanghai Bell, Alcatel-Lucent; "Impact of UL CoMP to HARQ operations"; R2-092196; 3GPP TSG RAN WG2 Meeting #65; Seoul, Korea, Mar. 23-27, 2009.

3GPP TR 36.814 V0.4.1 (Feb. 2009); 3rd Generation Partnership Project; Technical Specification Group Radio Access network; Further Advancements for E-UTRA Physical Layer Aspects (Release 9); Feb. 2009.

* cited by examiner

INTRODUCING A DELAY IN THE TRANSMISSION OF A NACK FOR A PACKET RECEIVED EMPLOYING COORDINATED MULTI-POINT TRANSMISSION

CROSS REFERENCE TO RELATED APPLICATION

This is a continuation of Application PCT/GB2009/002030, filed Aug. 20, 2009, now pending, the contents of which are herein wholly incorporated by reference.

This invention generally relates to telecommunications systems such as mobile communications systems and in particular, to a method of transmitting and receiving data using HARQ where multiple reception points optimally combine received data.

Next generation mobile communications such as the Universal Mobile Telecommunications System (UMTS) and the UMTS Long Term Evolution (LTE) aim to offer improved services to the user compared to existing systems. These systems aim to offer high data rate services for the processing and transmission of a wide range of information, such as voice, video and wireless data.

LTE is a technology for the delivery of high speed data services with increased data rates for the users. Compared to UMTS and previous generations of mobile communications standards, LTE is also to offer reduced delays, increased cell edge coverage, reduced cost per bit, flexible spectrum usage and multi-radio access technology mobility.

LTE has been designed to give peak data rates in the downlink (DL) (communication from a base station (BS) to a user equipment (UE) of above 100 Mbps, and above 50 Mbps in the uplink (UL) (communication from the UE to the BS). LTE-Advanced (LTE-A), which is currently being standardised, will further improve the LTE system to allow up to 1 GBps in the downlink and 500 Mbps in the uplink.

The OSI model divides the complex tasks of computer-to-computer communications into a series of layers. Layers in the OSI model are ordered from lowest level to highest. Together, these layers comprise the OSI stack. The LTE stack contains the following layers from lowest to highest as follows: 1. PHY layer, 2. Layer 2 (includes MAC, RLC, PDCP) and 3. Layer 3 (includes RRC). UMTS, LTE and LTE-A can all use higher layer Automatic Repeat ReQuest (ARQ), a scheme in which the receiving terminal requests retransmission of packets that are not correctly decoded. Additionally, a lower layer Hybrid ARQ (HARQ) scheme is used; this is a simultaneous combination of ARQ and some Forward Error Coding (FEC). The HARQ referred to is the lowest sublayer of layer2 and the ARQ is in the RLC (one sub-layer higher).

Both ARQ and HARQ work by processing received packets and determining if those packets are received with or without errors. For packets received with errors a NACK (Negative ACKnowledgment) control signal is sent to the transmitter to indicate this error. For packets successfully decoded by the receiver an ACK (ACKnowledgement) control signal is sent to the transmitter. The transmitter will either retransmit a data packet or send a new data packet depending on the received control signal. Usually when the transmitter receives an ACK, a new data packet is transmitted from the transmission buffer and when a NACK is received a re-transmission of the previously transmitted packet is transmitted to the receiver. When a re-transmission of a packet is received by the receiver it may attempt to combine the new information with the previously unsuccessfully decoded packet in order to now successfully decode the packet. The combination of original and re-transmitted packets (or soft combining) will increase the probability that the packet is decoded successfully.

Typically HARQ is performed in the DL and UL by multiple HARQ processes (stop and wait HARQ channels or time slots acting as transmission opportunities for packets of data) in a HARQ entity (an entity with HARQ enabled). That is, the HARQ process for one data packet can start before the HARQ process for the previous data packet is complete. The use of multiple HARQ processes allows the transmission of data to be continuous and not stop whilst the transmitter is awaiting the transmission of ACK or NACK from the receiver. So for 8 channels there will be 8 time frames (1 . . . 8) in which data can be sent. Thus new data can be sent in 8 consecutive time slots without having to wait for the ACK/NACK signal to be sent back from the receiver to the transmitter.

Typically the receiver can transmit NACK a number of times for a given packet up to a maximum number of transmissions, which is typically pre-defined before the first data packet from a data stream belonging to a service is transmitted.

In general, HARQ schemes can be categorized as either synchronous or asynchronous in their timing relationship between first and re-transmissions. In a synchronous scheme, the re-transmissions of data packets which have been NACKed occur at a pre-defined timing relative to the initial transmission. The advantage of using this pre-defined timing offset is that there is no need to signal to the receiver such control information as an HARQ process number. Such an HARQ process number is obtained from the timing of the received data packets. In an asynchronous scheme, a re-transmission can occur at any time relative to the first transmission. In this case the HARQ process number will be required so as to identify which HARQ process the re-transmission is related to. In LTE synchronous HARQ is used for the UL and for the DL.

FIG. 1 shows the timing relationship for the synchronous DL and UL HARQ operation in LTE. In the DL (upper) section 10, the base station transmits control/allocation information and the UE received it after a transmission time of Txt. Conversely, in the UL (lower) section 20 the UE transmits and the eNB receives after transmission time Txt. The shaded sections show transmission of particular allocation information from the eNB and the response from the UE. The Physical Uplink Shared Channel (PUSCH) shown here carries data from the Uplink Shared Channel (UL-SCH) transport channel, and uses DFT-Spread OFDM (DFT-S-OFDM). In this diagram the UE will receive control/allocation information on the PDCCH (Physical Data Control Channel) on the UE DL. This will result in an allowed UL transmission at any time up to the maximum UE processing time shown in the diagram. After reception of the UL data the eNB has a pre-determined fixed eNB processing time (3 ms for LTE) in which its has to send back the ACK/NACK information on the PDCCH/PHICH (Physical HARQ Indicator Channel) control channel to the UE. This will indicate to the UE if a re-transmission is required or a new transmission can occur.

In LTE the synchronous UL HARQ is controlled by the UE in 2 ways: the UE can send ACK/NACK signals with the ACK/NACK indication on the HARQ Indicator CHannel (HICH) and also resources for the UL transmission or re-transmission are indicated with resource allocation signalling on the Physical Data Control Channel (PDCCH). The following table 1 shows how the combination of ACK/NACK and resource allocation is currently interpreted.

TABLE 1

| HARQ feedback seen by the UE | PDCCH seen by the UE | UE behaviour |
|---|---|---|
| ACK or NACK | New Transmission | New transmission according to PDCCH |
| ACK or NACK | Retransmission | Retransmission according to PDCCH (adaptive retransmission) |
| ACK | None | No (re)transmission, keep data in HARQ buffer and a PDDCH is required to resume retransmissions |
| NACK | None | Non-adaptive retransmission |

LTE-A will use new techniques to improve the performance over existing LTE systems, particular for the transmission of higher data rates and improvements to cell edge coverage.

Coordinated multi-point (CoMP) transmission/reception can be used as a tool to improve the coverage of high data rates, the cell-edge throughput and/or to increase system throughput. CoMP is being considered for inclusion in the LTE-Advanced (LTE-A) technical specifications.

Downlink coordinated multi-point transmission implies dynamic coordination among multiple geographically separated transmission points. Uplink coordinated multi-point reception is expected to have very limited impact on the LTE Radio Area Network (RAN1) specifications for the physical layer of the radio interface for UE. Scheduling decisions can be coordinated among cells to control interference and may have some RAN1 specification impact.

Transmission and reception of HARQ ACK/NACK signalling is complicated for the case of UL CoMP when the transmission paths for the data and control signals can have significantly different and variable transmission times. For example when data is transmitted on the UL it may be received in multiple geographically separated locations with significant transport delays between them. This will complicate the design for soft combining of the packets from the distributed reception points and the transmission of the associated ACK/NACK signalling.

The reception of data from a UE in the UL at multiple geographically separated points will require the combining of these UL signals in some network node to allow the combining of the different UL data streams in an optimum way (for example either Joint Processing (JP) or Coordinated Scheduling/Beamforming.)

It is desirable to implement CoMP or other similar functionality without a significant negative effect on the method used for the acknowledgment of receipt of data.

The invention is defined in the independent claims, to which reference should now be made. Advantageous developments are set out in the dependent claims.

According to a first method aspect, embodiments of the invention provide a communication method in a first apparatus, in which the first apparatus receives data via a direct route from a second apparatus and transmits in response an acknowledgement signal, wherein if the same data has also been transmitted via an indirect route and the data is not properly received via the direct route, the first apparatus introduces an indirect-route delay in transmitting the acknowledgement signal to allow receipt of the data via the indirect route, and otherwise no indirect-route delay is introduced.

Thus according to invention embodiments, a delay to allow for receipt of the data over an indirect route is only applied as necessary. If the data is properly received (that is correctly received, for example so that it is decodable or decodable with a minimum percentage chance of error) no such delay will be introduced.

The skilled person will appreciate that the terms "direct route" and "indirect route" are comparative so that the direct route may include some form of relaying, as long as it is still covers fewer links than the indirect route (which may also be further relayed). However, in most embodiments the term direct route will indicate a single link or hop, for example from a mobile handset to a base station.

The delay may be implemented in any suitable fashion. Preferably a DTX signal (which can be viewed as a lack of transmission where transmission might be expected) replaces the expected acknowledgement signal to produce the indirect-route delay.

Of course there may be circumstances in which it is not appropriate to introduce the indirect-route delay even if the data is not properly received and transmission over the indirect route is still await. Advantageously, the first apparatus only introduces an indirect-route delay if the same data has also been transmitted via an indirect route, the data is not properly received via the direct route and the quality of service requirements in operation allow such a delay.

The quality of service requirements may be global and fixed over a certain period of time, or call/user specific. In some embodiments an indirect-route delay function of the first apparatus is configured to take transmission parameters (characteristics) of the data into account to thus determine whether a indirect-route delay is introduced and/or a maximum length of the indirect-route delay. Thus for example, if the data is flagged as urgent or of high importance, the indirect-route delay may be deselected in all circumstances, so that retransmission is requested immediately if the data received over the direct route cannot be decoded, that is, before the data has been received over the indirect route. This configuration may be prior to transmission or with transmission. In one implementation a decision as to introduction and/or length of the indirect-route delay is pre-configured before data transmission according to data packet characteristics.

The communication method may further include transmission of a resource allocation signal which in combination with the acknowledgement signal sent to the second apparatus is interpreted for controlling transmission and retransmission of the data. For example, a physical data control channel can provide resource allocation.

In many embodiments the acknowledgement signal comprises a positive acknowledgement if the data is properly received or a negative acknowledgement if the data is not properly received. For example, the acknowledgement signal may be an ACK/NACK signal in ARQ or HARQ. Thus suitably, the negative acknowledgement acts as a request for retransmission of the data at a specified or predetermined time.

Preferably the indirect-route delay allows a predetermined time slot, for retransmission of the data to the first apparatus if a negative acknowledgement is sent, to be used instead for transmission of new data. This advantageous effect is suitable with synchronous acknowledgement methodologies.

The indirect-route delay according to invention embodiments may lead to soft combining of data from the indirect and direct routes as appropriate. Preferably if the indirect-route delay is introduced, the data is stored in the first apparatus and subsequently combined with the same data received via the indirect route to form multi-point combined data. The term multi-point combined data is used to refer to data collated from transmission to multiple points.

Preferably the first apparatus assesses the multi-point combined data and transmits an acknowledgement signal with a positive acknowledgement if the multi-point combined data is decodable or a negative acknowledgement if the multi-point combined data is not decodable.

Invention embodiments are particularly suitable for applications in which the data is sent as a data packet in a wireless communication system on the uplink, for example for a UMTS, LTE or LTE-A system.

In these and other cases the transmission via the direct route and indirect route may be part of a coordinated multi-point methodology. Although reference has been made herein to a single indirect route, more than one indirect route can alternatively be provided, for example the direct and indirect routes may reflect a coordinated multi-point transmission point set.

According to an apparatus aspect corresponding to the first method aspect, invention embodiments provide a first apparatus, comprising a receiver operable to receive data from a second apparatus via a direct route and an indirect route; a processor operable to determine whether the directly received data can be decoded; a transmitter operable to transmit in response an acknowledgement signal; and a controller operable, if the same data has also been transmitted via an indirect route and the data received via the direct route is not decodable, to introduce an indirect-route delay in transmitting the acknowledgement signal to allow receipt of the data via the indirect route, and otherwise not to introduce such an indirect-route delay.

According to a still further aspect, invention embodiments provide a communication system comprising a first apparatus and a second apparatus; the second apparatus comprising a transmitter operable to transmit data to the first apparatus; the first apparatus comprising a receiver operable to receive the data from the second apparatus via a direct route and an indirect route and a transmitter operable to transmit an acknowledgement signal, wherein the first apparatus also comprises a controller operable, if the same data been transmitted via the direct route and also via the indirect route and the data is not properly received via the direct route, to introduce an indirect-route delay in transmitting the acknowledgement signal to allow receipt of the data via the indirect route, and otherwise not to introduce such an indirect-route delay.

Preferably the first apparatus is a base station (such as an e node Base Station in an LTE system) and the second apparatus is a user equipment (such as a mobile telephone handset or other mobile or fixed end user device).

As mentioned previously, a DTX, or non-transmission signal may be sent as the delay, in which case a buffer in the second apparatus (or UE) is operable to store the data for re-transmission if it receives a DTX signal in the place of the acknowledgement signal.

Preferably, the second apparatus includes a timer which is operable to control the maximum indirect-route delay allowed for re-transmission of the data.

According to a further method aspect, invention embodiments provide a method in a communication system comprising a first apparatus and a second apparatus; the method comprising the second apparatus transmitting data to the first apparatus, the first apparatus receiving the data via a direct route; and if the same data has also been transmitted via an indirect route and the data is not properly received via the direct route, introducing an indirect-route delay in transmitting an acknowledgement signal to allow receipt of the data via the indirect route, and otherwise not introducing such an indirect-route delay.

According to a final aspect, invention embodiments provide a computer program which when downloaded onto an apparatus causes it to become the first apparatus detailed above or which when executed on a computing device of a telecommunications apparatus carries out the method of any of the preceding method claims.

Features detailed above with respect to any different aspects may be combined with any or all the features of the other aspects since they refer to the same invention. In particular, means may be provided in the apparatus aspects which reflect the method steps set out in detail above.

Preferred features of the present invention and comparative examples will now be described, purely by way of example, with reference to the accompanying drawings, in which:

FIG. 1 pictures the timing relationship for the synchronous DL and UL HARQ operation in LTE;

Figure 2:
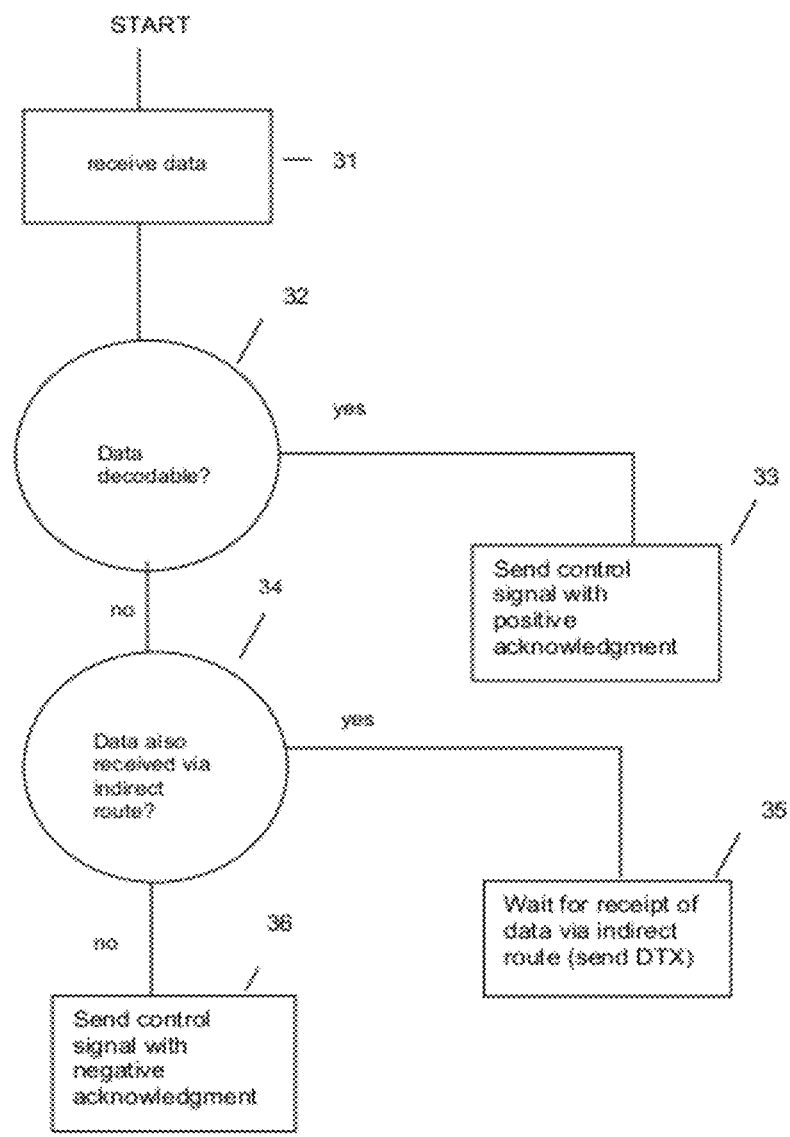
FIG. 2 is a flow chart of a general embodiment.

FIG. 2 illustrates a general embodiment of the invention. In step 31 data is received (for example by a base station on the uplink). In step 32 it is decided whether the data is decodable, if so, the method ends in step 33 with transmission of a positive acknowledgement. The method may then recommence with a separate process for a subsequent data packet. However, if the data is not decodable, the method checks in step 34 whether the data is also to be received over an indirect, longer path. If not, the method ends in step 36 with a negative acknowledgement (probably with a request for retransmission). If data is expected over the longer path, then a delay is introduced in step 35, to allow its receipt, in case the data over this second route will allow decoding and obviate the need for retransmission.

Figure 3:
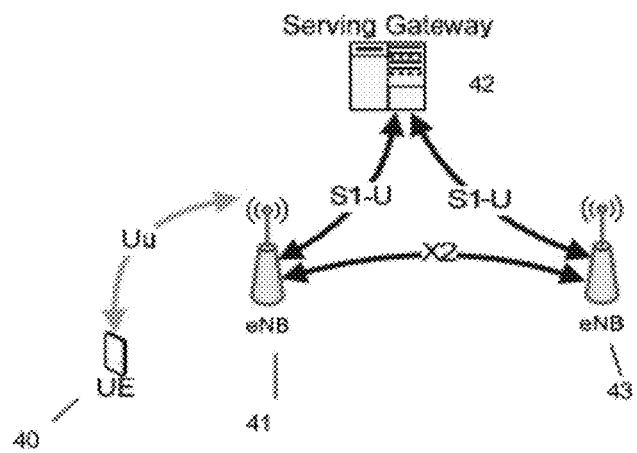
FIG. 3 is a schematic diagram of LTE Network Architecture.

LTE is suitable for implementation of the invention and a typical LTE network is shown in FIG. 3. In this diagram a User Equipment (UE) 40 is connected to an enhanced Node-Base-station (eNB) 41 by the radio interface (Uu). The User Plane (UP) data for this UE is routed to a Serving GateWay (SGW) 42 into the SAE (System Architecture Evolution) which is the core network architecture for LTE. Typically the serving gateway is used for several eNBs (represented here as two SGWs 42 and 43) which may be interconnected by an X2 interface, which may be a real physical connection between the eNBs or implemented as a logical connection via other network nodes. The S1-U interface connects the eNBs to the Serving Gateway.

Figure 4:
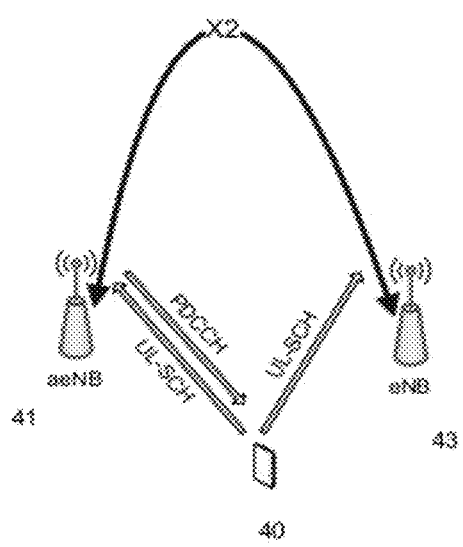
FIG. 4 is a schematic diagram of UL CoMP.

As shown in FIG. 4, when CoMP is used, an anchor (or serving) eNB (aeNB) 41 allocates transmission resource in the DL and then packets will be transmitted by the UE 40 in the UL to the aeNB and to at least other eNB 43 defined in a CoMP transmission point set. Data will be forwarded from the eNBs in the CoMP transmission point set for combining in the anchor eNB (aeNB). This data forwarding will use the X2 interface between eNBs as shown in FIG. 4. Because of the processing time in the eNBs and the X2 delays it is likely that the total delay will be longer than the currently envisaged HARQ round trip time (RTT). This delay could cause data stalling of HARQ processes and/or other problems.

In the current operation of the LTE UL if Packet A is not received correctly a NACK will be sent to the UE indicating the need for a re-transmission.

Figure 1:
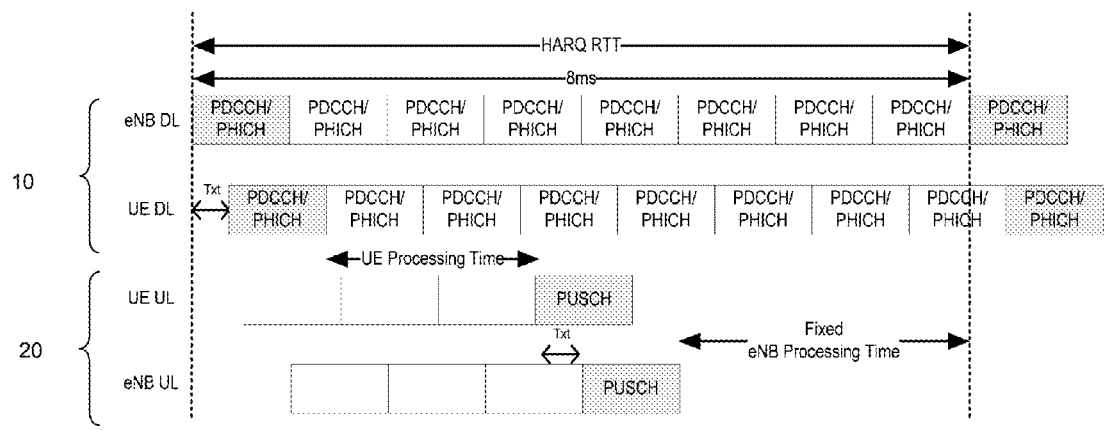

FIG. 1 shows that for the LTE FDD UL there is a defined time of 3 ms for the eNB to decode the UL transmission form the UE and transmit either ACK or NACK. As mentioned above, it is very likely that for UL CoMP schemes that the delay (processing and X2 backhaul) in receiving information from other eNBs would be greater than this 3 ms.

Figure 5:
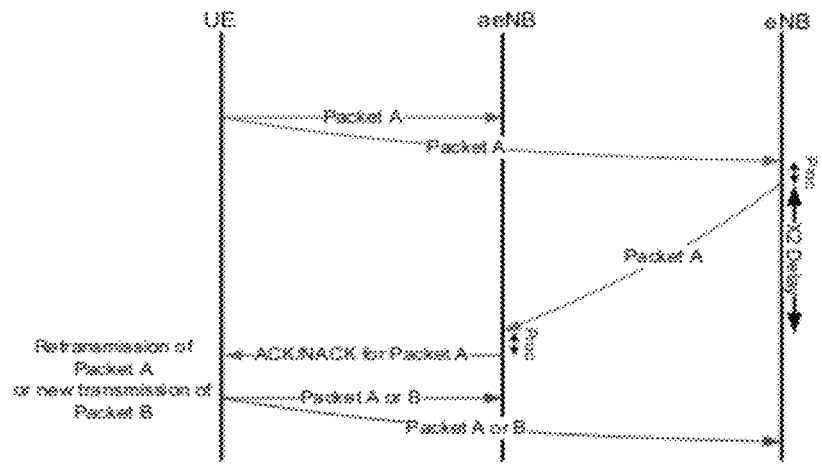
FIG. 5 is a schematic timing diagram for UL CoMP HARQ Processing with extra wait time.

When UL CoMP is used it is assumed that data sent by the UE on the UL-SCH will be received by eNBs defined as part of the CoMP transmission point set. FIG. 5 is a schematic timing diagram showing signalling between the UE, aeNB and another eNB. The vertical axis represents time. Initially, the UE transmits Packet A which is received by the aeNB and, later, by the other eNB. The other eNB processes Packet A in time Proc and then sends it to the aeNB, in time X2 Delay. The aeNB combines Packet A from the direct route and Packet A from the indirect route via the other eNB and attempts decoding (in time Proc) and then sends the ACK/NACK to the UE based on the decoding attempt. Subsequently the UE re-sends Packet A in response to a NACK, or transmits new Packet B in response to an ACK. FIG. 5 demonstrates the anticipated effect of taking into account the combined X2 and processing delays with the anchor eNB and with a single further eNB. Here the delays contribute to extending the HARQ RTT (round trip time) time and the aeNB thus delays sending the ACK/NACK until there is sufficient time for Packet A to be received via the other NB. Such a solution is set out in brief in 3GPP TSG RAN WG2 #65bis "Impact of UL CoMP to HARQ operations". This reference also suggests sending an ACK/NACK signal corresponding to the signal received by the aeNB only, to be followed by a new signal taking data received via the other eNB into account. A third, preferred option in this reference is to send an initial positive acknowledgement to the UE irrespective of the proper receipt of the signal at the eNB. If the ACK is sent with no PDCCH, the data will be held in the UE. The anchor eNB can check whether combined data including data from the other eNBs is received properly and then send a corresponding ACK/NACK signal and PDCCH.

Although extending the HARQ RTT by introducing a longer delay or including extra transmissions to allow for CoMP according to the second two options above both potentially solve the problem of operating HARQ when used with UL CoMP, the disadvantage of this is that UEs operating with CoMP will always have a different HARQ RTT or extra signalling compared with UEs operating without CoMP. This complicates the design of the whole LTE system and could result in more difficult scheduling for the eNB. Also, any extension of the HARQ RTT or permanent extra signalling will add to the delays of the data packets through the LTE system.

Figure 6:
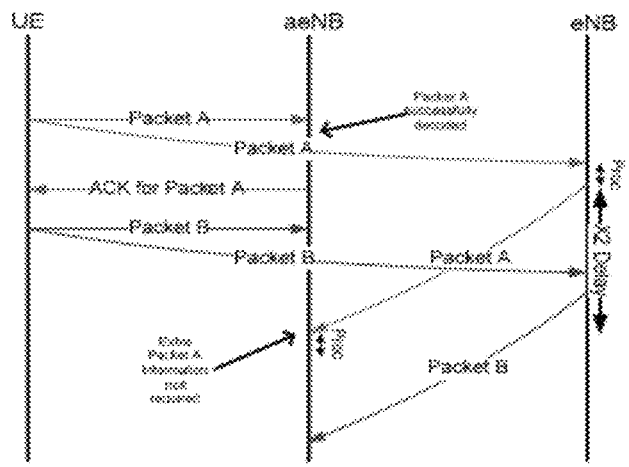
FIG. 6 is a schematic timing diagram for UL CoMP HARQ Processing with ACK from aeNB.

FIG. 6 is essentially similar to FIG. 5 and detailed description thereof is omitted for brevity. This timing diagram shows that if Packet A can be successfully decoded without using additional information from the other eNB then an ACK can be sent from the aeNB at that stage and Packet B can be transmitted. Here the extra information sent from the second eNB is not required.

The inventor has come to the realisation that in this particular case which in fact corresponds to normal operation for most packets, there is no need for additional data packet delay and it would be advantageous if the system could operate just as it would without the use of CoMP. Previously there has been the perception that data is required from both the direct and the indirect route and it is true that sometimes, for example at certain physical locations (UE at cell edges for example), the received direct path alone is never enough. However invention embodiments allow a single ACK to be sent on the basis of the data received via the direct route only if possible. In this case further signalling is necessary.

Figure 7:
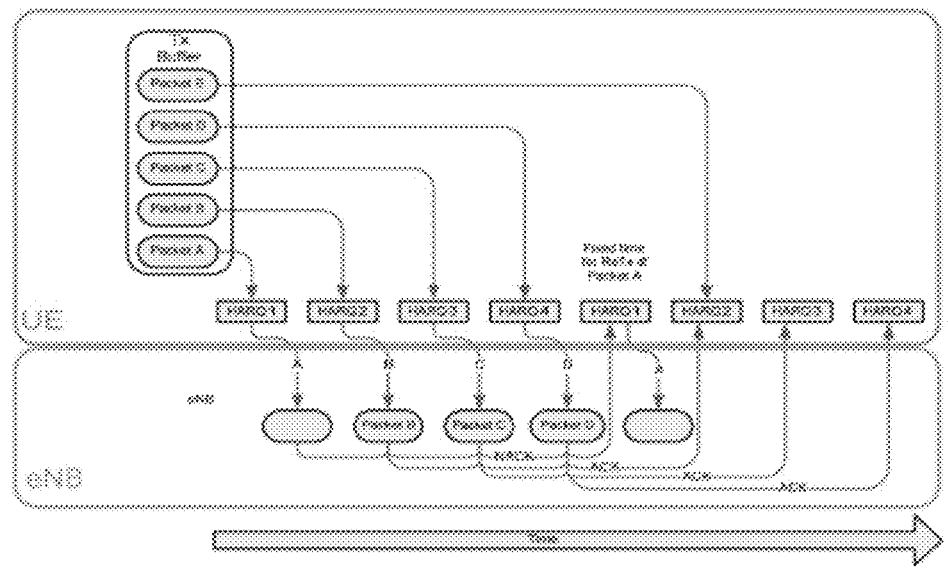
FIG. 7 depicts an information flow diagram of HARQ Processing for Synchronous Transmission.

Turning to unsuccessful reception of the data, FIG. 7 shows an example of synchronous HARQ processing when 4 HARQ separate processes (or time windows) are available in a single frame or other time unit. In this example packets are transmitted from the UE to the eNB. Packets are buffered in a UE buffer and transmitted in the order Packet A, Packet B, Packet C, etc. Each packet is allocated to an HARQ process number for transmission (and re-transmission if necessary, in which case the same HARQ process in a subsequent time period is used). In this example the eNB does not successfully decode Packet A. A NACK signal is sent to the UE so that the HARQ 1 process can be used for a re-transmission of Packet A. Thus Packet E is then transmitted on HARQ process 2.

Figure 8:
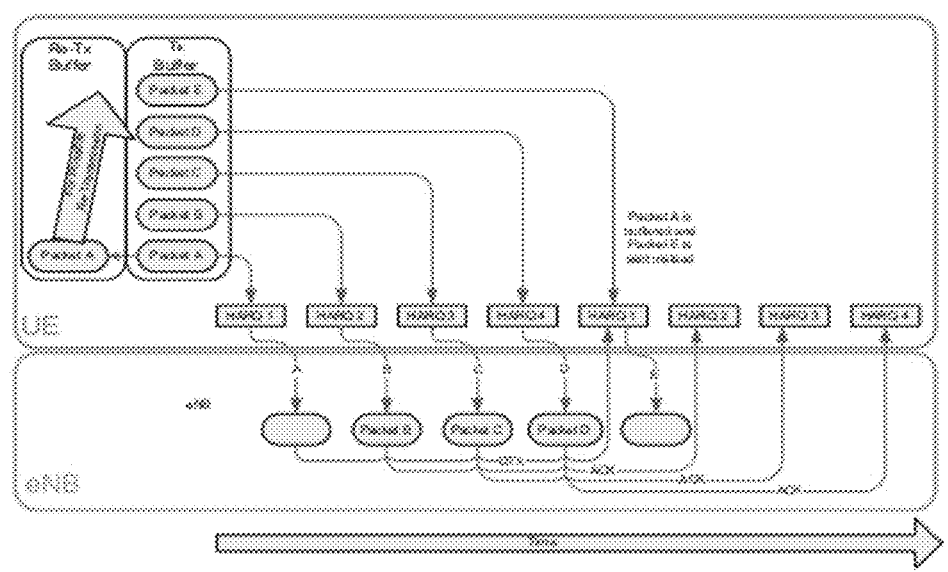
FIG. 8 depicts an information flow diagram for HARQ Processing for Delayed Synchronous Transmission according to invention embodiments.

FIG. 8 shows an embodiment of the invention with essentially the same example as detailed in FIG. 7 but instead of the NACK being signalled back from the eNB to the UE in this case a DTX (or nothing) is sent back to the UE. The purpose of sending this DTX (or nothing) signal is that the eNB is expecting that it can make a better attempt to decode Packet A if it receives additional information (for example soft bits) from one or more other eNBs that have received the original transmission of Packet A.

The UE, when it receives the DTX, will in this case buffer Packet A in the transmission buffer or in an additional UE re-transmission buffer for later possible re-transmission. The UE then sends Packet E on the HARQ process 1, that it would have normally used for the re-transmission of Packet A. As the aeNB attempts to decode Packet A using additional information from neighbouring eNBs it will typically start a timer for this activity. After a pre-determined time interval, either Packet A is successfully decoded or it can be re-transmitted from the UE Re-Transmission buffer. The control of the re-transmission of Packet A can be made by a combination of the existing signalling used for the control of re-transmissions (with the PDCCH/PHICH channel) or alternately by new control signalling.

For LTE UL the ACK/NACK signalling on the PHICH is accompanied by a resource allocation on the PDCCH that is combined with an indication if the resource is for a new transmission or a re-transmission (or no indication). This PDCCH signalling indicates to the UE whether a new transmission or a re-transmission is required by the use of a redundancy version (RV).

As an aside, a Redundancy Version (RV) specifies a starting point in the circular buffer to start reading out bits. Different RVs are specified by defining different starting points to enable HARQ operation. Usually RV=0 is selected for the initial transmission to send as many systematic bits as possible. The scheduler can choose different RVs on transmissions of the same packet to support both IR (Incremental Redundancy) and Chase combining HARQ.

The combination of a NACK being send on the PHICH for HARQ 1 with no indication resource allocation can be interpreted by the UE to mean that a non-adaptive (same modulation and coding scheme) re-transmission of a previously buffered packet A is required, as in Table 1. Re-interpretation of the signalling can be pre-configured for this case where a delayed re-transmission of a particular packet is required, as might be the case when UL CoMP is used. Table 2 below gives an example of how the signalling could be reconfigured.

TABLE 2

| HARQ feedback seen by the UE | PDCCH seen by the UE | UE behaviour |
| --- | --- | --- |
| ACK or NACK | New Transmission | New transmission according to PDCCH |
| ACK or NACK | Retransmission | Retransmission according to PDCCH (adaptive retransmission) |
| ACK | None | No (re)transmission, keep data in HARQ buffer and a PDDCH is required to resume retransmissions |
| NACK | None | Non-adaptive retransmission |
| DTX | New Transmission | New transmission according to PDCCH, keep data in HARQ buffer |

In this instance, the values in Table 1 are retained for ACK and NACK signalling and a DTX signal is accompanied by "New Transmission" signalling on the PDCCH channel, which combination indicates to the UE that data is to be stored in the HARQ buffer and new transmission is required.

Figure 9:
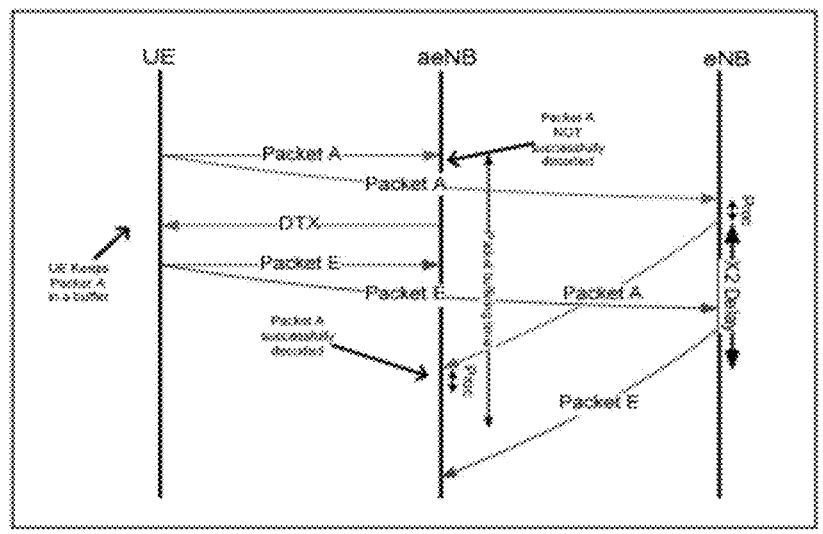
FIG. 9 is a schematic timing diagram for UL CoMP HARQ Processing with DTX and delayed Re-Transmission according to invention embodiments.

The signalling flow for delayed re-transmission is also shown in FIG. 9 which pictures one approach to what could happen if the aeNB does not successfully decode Packet A, and rather than sending a NACK, nothing (DTX) is sent instead. When DTX is sent typically this means that although the UE is expecting to receive either an ACK or NACK signal, nothing is detected. This lack of ACK/NACK signalling is depicted in the following figures as the sending of DTX from the aeNB to the UE.

When the UE does not receive either ACK or NACK it should keep Packet A in a buffer for possible retransmission. The advantage of this mode of operation is that the synchronous HARQ time slot that would be used for the re-transmission of Packet A is freed up for the transmission of new data from the UE data buffer (Packet E in this example).

Figure 10:
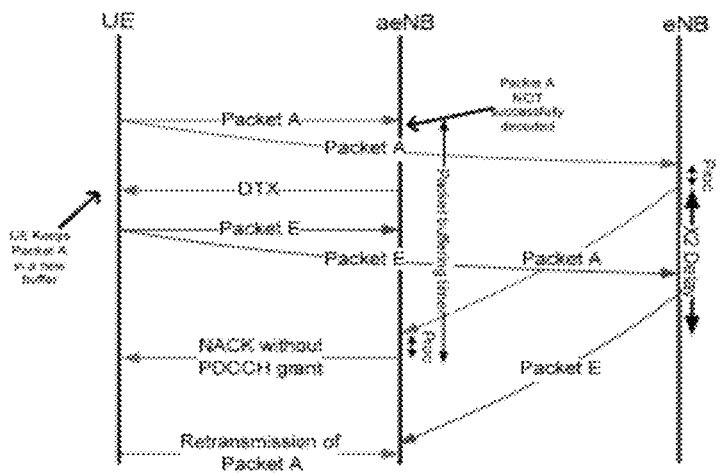
FIG. 10 is a schematic timing diagram for UL CoMP HARQ Processing with request for delayed re-transmission according to invention embodiments.

A timer in the aeNB is started at this time to control the maximum amount of time that a delayed re-transmission of packet A is possible. This time could be related to a QOS requirement for the data service being used by the data packets, for example in a delay sensitive service, packets which are delayed for too long become useless to the application sending and receiving those packets. In this example, the extra reception of Packet A sent from the second eNB to the aeNB allows Packet A to be successfully decoded. The key advantage of this mode of operation according to invention embodiments is that the UE does not have to waste the UL resources allocated to the potential re-transmission of Packet A and can instead use this UL resource flexibly for the transmission of Packet E. FIG. 10 shows what will happen if the aeNB is still unable to decode Packet A even after additional information has been received from the second eNB. A NACK will be sent from the aeNB to the UE which will instruct the UE to perform a delayed re-transmission of Packet A on the same HARQ process from its UE buffer.

In summary, embodiments of this invention propose that in the case of UL HARQ processing when CoMP is used, the aeNB sends DTX if the packet is not received correctly. The UE may be allowed to store packets (in response to the DTX) and retransmit them before the expiration of a packet buffer delay timer in the aeNB.

A secondary feature of embodiments of this invention is that a control signal (or combination of existing control signals) can be used to control the timing of the delayed re-transmission. This choice of when to ask for a delayed re-transmission could be based on QoS or other requirements for the data packets that have been scheduled for transmission.

Additionally, the method of indicating that the UE has to interpret the control signals differently for controlling re-transmissions can either be signalled during an initial configuration period before data transmission or by a control signal sent along with the data transmission.

A primary advantage of many invention embodiments is that the data packet delay will be reduced in the case of both transmissions and re-transmissions. A secondary advantage can be allowing the operation of CoMP UEs at the same time as the use of non-CoMP UEs with the same HARQ RTT. Additionally invention embodiments can allow the re-use of resources that would become blocked because of the need to wait for delayed ACK/NACK signalling feedback.

Although described with respect to an LTE system as an example, the present invention is not linked to such use.

The fields of application of this invention would include all wired and wireless communications systems where HARQ protocols or other re-transmission protocols are used in combination with CoMP and/or relaying techniques.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A communication method in a first apparatus, in which the first apparatus receives data via a direct route from a second apparatus and transmits in response an acknowledgement signal, wherein
   when the same data has also been transmitted via an indirect route and the data is not properly received via the direct route, the first apparatus introduces an indirect-route delay in transmitting the acknowledgement signal to allow receipt of the data via the indirect route, and otherwise no indirect-route delay is introduced, wherein the first apparatus only introduces the indirect-route delay when the same data has also been transmitted via the indirect route, the data is not properly received via the direct route and quality of service requirements in operation allow the indirect-route delay, and wherein when the data is identified with higher quality of service requirements, the indirect route is not selected so that retransmission is requested immediately when the data is not properly received via the direct route.

2. The communication method according to claim 1, wherein a DTX signal replaces the acknowledgement signal to produce the indirect-route delay.

3. The communication method according to claim 1, in which an indirect-route delay function of the first apparatus is configured to take characteristics of the data into account to thus determine whether the indirect-route delay is introduced and/or a maximum length of the indirect-route delay.

4. The communication method according to claim 1, wherein a decision as to introduction and/or length of the indirect-route delay is pre-configured before data transmission according to data packet characteristics.

5. The communication method according to claim 1, further including transmission of a resource allocation signal which in combination with the acknowledgement signal is interpreted for controlling transmission and retransmission of the data.

6. The communication method according to claim 1, wherein the acknowledgement signal comprises a positive acknowledgement if the data is properly received or a negative acknowledgement if the data is not properly received.

7. The communication method according to claim 6, wherein the indirect-route delay allows a predetermined time slot, for retransmission of the data to the first apparatus if the negative acknowledgement is sent, to be used instead for transmission of new data.

8. The communication method according to claim 6, wherein the negative acknowledgement acts as a request for retransmission of the data at a specified or predetermined time.

9. The communication method according to claim 1, wherein the acknowledgement signal is an ACK/NACK signal in synchronous ARQ or HARQ.

10. The communication method according to claim 1, wherein if the indirect-route delay is introduced, the data is stored in the first apparatus and subsequently combined with the same data received via the indirect route to form multi-point combined data.

11. The communication method according to claim 10, wherein the first apparatus assesses the multi-point combined data and transmits the acknowledgement signal with a positive acknowledgement if the multi-point combined data is decodable or a negative acknowledgement if the multi-point combined data is not decodable.

12. The communication method according to claim 1, wherein the data is sent as a data packet in a wireless communication system on an uplink, in a Universal Mobile Telecommunications System (UMTS), Long Term Evolution (LTE) or LTE-Advanced (LTE-A) system.

13. The communication method according to claim 1, wherein a transmission via the direct route and indirect route is part of a coordinated multi-point methodology.

14. A first apparatus, comprising:
a receiver operable to receive data from a second apparatus via a direct route and an indirect route;
a processor operable to determine whether the received data via the direct route can be decoded;
a transmitter operable to transmit in response an acknowledgement signal; and
a controller operable, when the same data has also been transmitted via the indirect route and the data received via the direct route is not decodable, to introduce an indirect-route delay in transmitting the acknowledgement signal to allow receipt of the data via the indirect route, and otherwise not to introduce the indirect-route delay, wherein the transmitter only introduces the indirect-route delay when the same data has also been transmitted via the indirect route, the data is not properly received via the direct route and quality of service requirements in operation allow the indirect-route delay, and wherein when the data is identified with higher quality of service requirements, the indirect route is not selected so that retransmission is requested immediately when the data is not properly received via the direct route.

15. A communication system comprising a first apparatus and a second apparatus;
the second apparatus comprising a transmitter operable to transmit data to the first apparatus;
the first apparatus comprising a receiver operable to receive the data from the second apparatus via a direct route and an indirect route and a transmitter operable to transmit an acknowledgement signal, wherein
the first apparatus also comprises a controller operable, when the same data has been transmitted via the direct route and also via the indirect route and the data is not properly received via the direct route and quality of service requirements in operation allow such a delay, to introduce an indirect-route delay in transmitting the acknowledgement signal to allow receipt of the data via the indirect route, and otherwise not to introduce the indirect-route delay, and wherein when the data is identified with higher quality of service requirements the indirect route is not selected so that retransmission is requested immediately when the data is not properly received via the direct route.

16. The communication system of claim 15, wherein the first apparatus is a base station and the second apparatus is a user equipment.

17. The communication system according to claim 15, wherein a buffer in the second apparatus is operable to store the data for re-transmission if it receives a DTX signal in place of the acknowledgement signal.

18. The communication system according to claim 17, wherein the second apparatus includes a timer which is operable to control the maximum indirect-route delay allowed for re-transmission of the data.

19. A method in a communication system comprising a first apparatus and a second apparatus; the method comprising:
transmitting, at the second apparatus, data to the first apparatus; and
receiving, at the first apparatus, the data via a direct route; and
when the same data has also been transmitted via an indirect route, the data is not properly received via the direct route, and quality of service requirements in operation allow such a delay, introducing an indirect-route delay in transmitting an acknowledgement signal to allow receipt of the data via the indirect route, and otherwise not introducing the indirect-route delay, wherein when the data is identified with higher quality of service requirements the indirect route is not selected so that retransmission is requested immediately when the data is not properly received via the direct route.

20. A non-transitory, computer readable medium storing a computer program which when executed on a computing device of a telecommunications apparatus or computing devices of a first apparatus carries out a communication method in the first apparatus, in which the first apparatus receives data via a direct route from a second apparatus and transmits in response an acknowledgement signal, wherein
when the same data has also been transmitted via an indirect route and the data is not properly received via the direct route, the first apparatus introduces an indirect-route delay in transmitting the acknowledgement signal to allow receipt of the data via the indirect route, and otherwise no indirect-route delay is introduced, wherein the first apparatus only introduces the indirect-route delay when the same data has also been transmitted via the indirect route, the data is not properly received via the direct route and quality of service requirements in operation allow the indirect-route delay, and wherein when the data is identified with higher quality of service requirements the indirect route is not selected so that retransmission is requested immediately when the data is not properly received via the direct route.

* * * * *